United States Patent [19]

Brooks et al.

[11] Patent Number: 4,595,935

[45] Date of Patent: Jun. 17, 1986

[54] SYSTEM FOR DETECTING DEFECTIVE THERMAL PRINTHEAD ELEMENTS

[75] Inventors: Ralf M. Brooks; Arvindkumar C. Vyas; Brian P. Connell, all of Waterloo, Canada

[73] Assignee: NCR Canada Ltd., Mississauga, Canada

[21] Appl. No.: 640,894

[22] Filed: Aug. 14, 1984

[51] Int. Cl.[4] .............................................. G01D 15/10

[52] U.S. Cl. ................................ 346/76 PH; 400/54; 400/120; 219/216

[58] Field of Search ........................... 400/72, 54, 120; 346/76 R, 76 L, 76 PH, 139 C, 154; 219/216 PH, 482, 490, 492, 497–499, 506; 324/62–64

[56] References Cited

U.S. PATENT DOCUMENTS

| | | | |
|---|---|---|---|
| 4,284,876 | 8/1981 | Ishibashi et al. | 346/76 |
| 4,321,610 | 3/1982 | Moore et al. | 346/76 L |
| 4,364,063 | 12/1982 | Anno et al. | 346/76 |
| 4,453,166 | 1/1984 | Enoto | 346/76 PH |
| 4,500,893 | 2/1985 | Sakura et al. | 219/216 PH |

*Primary Examiner*—E. A. Goldberg
*Assistant Examiner*—A. Evans
*Attorney, Agent, or Firm*—Wilbert Hawk, Jr.; Albert L. Sessler, Jr.; George Jameson

[57] ABSTRACT

A system and method are disclosed for automatically detecting any defective elements in a linear array of thermal printhead elements of a thermal printer and for automatically correcting for at least one defective thermal printhead element. In a preferred embodiment of the invention an ON/OFF line from a microprocessor is turned OFF to turn off a voltage regulator, thereby preventing the thermal printhead elements from printing. With the voltage regulator OFF, a diode is forward biased to enable a voltage divider to be formed between a sensing resistor and any one of the thermal printhead elements that is activated at any given time. When a subsequent sense voltage (or resistance measurement) of an element exceeds the value of the initial reference sense voltage for that element by a predetermined amount, that element is detected as a defective element. A software subroutine, in the microprocessor is then utilized to change the position of serial data bits carrying data to be printed such that the detected defective thermal element is not utilized during a normal printing operation.

13 Claims, 12 Drawing Figures

SYSTEM FOR DETECTING DEFECTIVE THERMAL PRINTHEAD ELEMENTS

BACKGROUND OF THE INVENTION

1. Field of the Invention

This invention relates to thermal printing and more particularly to a system and method for automatically detecting defective thermal printhead elements in a thermal line printer or in a serial thermal printhead and for automatically correcting for at least one defective thermal printhead element.

2. Description of the Prior Art

In conventional thermal line printers the character positions are fixed in relation to the line of thermal resistive elements along the thermal printhead. To illustrate, assume that in a conventional thermal line printer each character position is 14 dots wide with an unused gap of 5 dots between acjacent character positions. Thus, in this example of a conventional thermal line printer, character 1 will always use resistive elements 1–14, character 2 will always use resistive elements 20–33, character 3 will always use resistive elements 39–52 , and so forth.

The problem with a thermal line printer having fixed character positions is that, when a resistive element burns out, there is no way that the conventional thermal line printer can automatically detect the failure of that resistive element. The failure of a resistive element only becomes known after an operator of the printer notices "holes" or gaps appearing in some of the printed characters. The operator might not notice these "holes" until after, for example, thousands of print lines have been printed with "holes" in some of the printed characters. After finally noticing such "holes", the operator then has to shut off the thermal line printer and summon a skilled technician to replace the defective thermal printhead. The down time of the thermal line printer may be quite long and, therefore, costly in terms of repair expenses and lost man hours of the operator.

The background art known to the applicants at the time of the filing of this application is as follows:

U.S. Pat. No. 4,284,876, Thermal Printing System, by N. Ishibashi et al;

U.S. Pat. No. 4,321,610, Dot Matrix Printer with Half Space Dot Capability, by D. F. Moore et al; and U.S. Pat. No. 4,364,063, Thermal Recording Apparatus, by G. Anno et al.

SUMMARY OF THE INVENTION

Briefly, a system and method therefor is provided for automatically detecting and correcting for a defective thermal printhead element in a thermal line printer or in a serial thermal printhead.

In accordance with one aspect of the invention, there is provided in a thermal printer including a linear array of thermal elements, an apparatus comprising:

means for producing during a first mode of operation serial character data having a preselected number of character positions selectively associated with said thermal elements and for producing during a second mode of operation serial test data;

means coupled to said thermal elements being selectively responsive to said serial test data for developing for each of said thermal elements an associated test signal during each second mode of operation; and means for selectively comparing each test signal for each thermal element against an associated predetermined reference value in order to generate an associated failure signal when a defective thermal element is detected during a second mode of operation.

In accordance with another aspect of the invention, there is provided a method for automatically detecting any defective thermal element in a linear array of thermal elements in a thermal printer, said method comprising the steps of: determining an associated reference signal for each thermal element; storing the associated reference signal for each thermal element; measuring a test signal for each thermal element during each of a sequence of test modes of operation; comparing each test signal for each thermal element with its associated reference signal during each test mode of operation; and detecting a defective thermal element when a test signal for that thermal element deviates by a preselected amount from the associated reference signal for that thermal element during the comparing step.

It is therefore an object of this invention to provide an improved thermal line printer which overcomes the disadvantages noted before with respect to conventional thermal line printers.

Another object of this invention is to provide a system and method for automatically detecting defective thermal printhead elements in a thermal line printer or a serial thermal printhead.

A further object of this invention is to provide a system and method for automatically detecting defective thermal printhead elements in a thermal printer and for automatically correcting for at least one defective thermal printhead element.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views and wherein.

DESCRIPTION OF THE PREFERRED EMBODIMENT

Although the thermal printer of the invention will be described in relation to its application in a thermal line printer, it should be realized that the thermal printer of the invention could be utilized in other applications. For example, the thermal printer of the invention can also be utilized in a serial thermal printhead.

Figure 1:
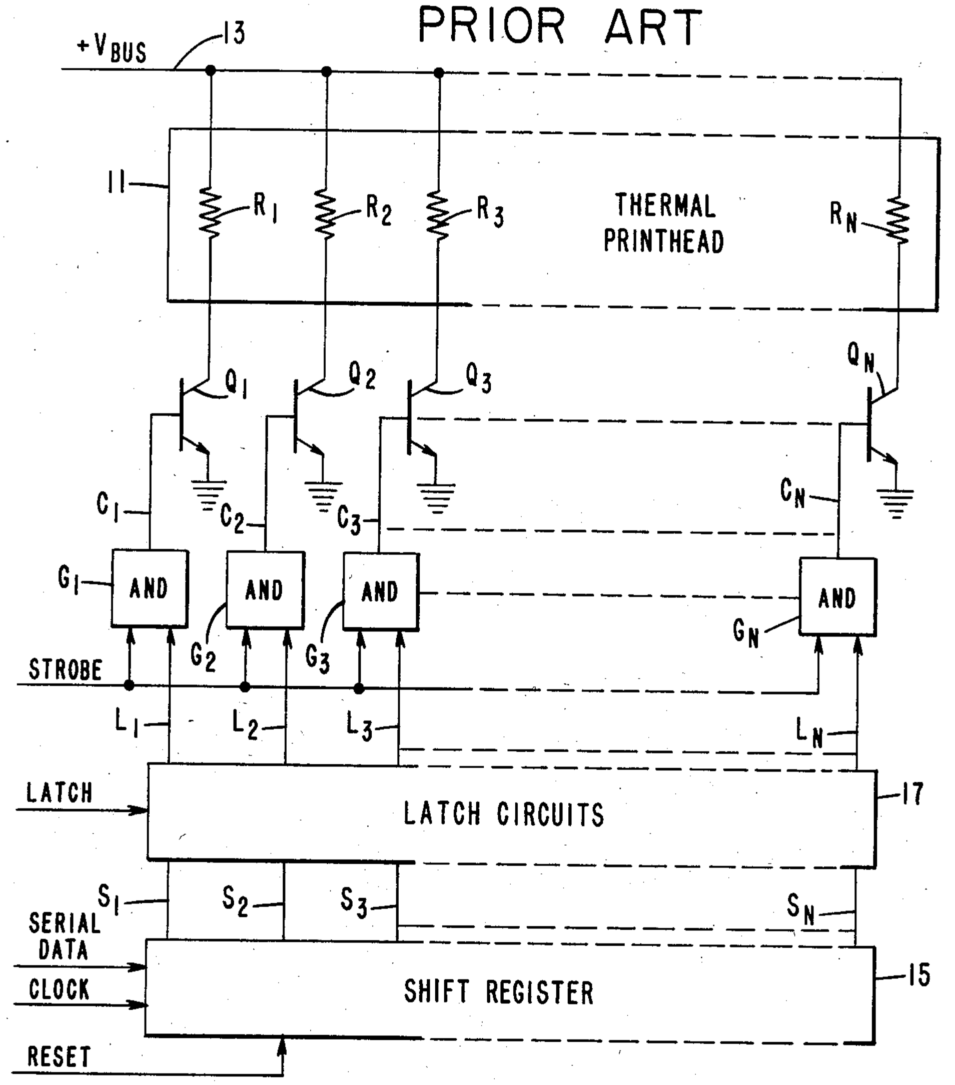
FIG. 1 PRIOR ART
FIG. 1 is a schematic block diagram of a prior art or conventional printer.

Referring now to the drawings, FIG. 1 discloses an example of a prior art thermal line printer.

In the thermal line printer of FIG. 1 thermal printhead or thermal resistive elements or heater elements $R_1$-$R_N$ are positioned in line on an insulated ceramic or glass substrate (not shown) of a thermal printhead 11. As shown in FIG. 1, upper terminals of the elements $R_1$-$R_N$ are commonly connected to a positive voltage source (not shown) via a $+V_{BUS}$ line 13, while lower terminals of the elements $R_1$-$R_N$ are respectively connected to the collectors of NPN driver transistors $Q_1$-$Q_N$, whose emitters are grounded. These transistors $Q_1$-$Q_N$ are selectively turned on (to be explained) by high or 1 state signals applied to their bases in order to ground preselected ones of the lower terminals of associated ones of the elements $R_1$-$R_N$ to thermally print a dot line of information. Each of the transistors $Q_1$-$Q_N$ that is turned on allows current to flow through its associated one of the thermal resistive elements $R_1$-$R_N$ for the length of time t that that transistor is turned on. The resulting $I^2Rt$ energy (typically 2-3 millijoules per element) causes heat transfer to a donor thermal transfer ribbon (not shown) when used or causes a recipient thermal paper (not shown) when used to develop.

In the operation of the thermal line printer of FIG. 1, a stream of serial data of N (binary) bits in length is shifted into a shift register 15 by CLOCK pulses until N bits are stored in the register 15. This shift register 15 is comprised of a sequence of N flip-flops (not shown) which are all reset to 0 state outputs by a RESET pulse before the stream of N bits of serial data is stored therein. These N bits of data in register 15 represent the next line of data that is to be thermally printed.

The N bits of data stored in register 15 are supplied in parallel over lines $S_1$-$S_N$ to associated inputs of latch circuits 17. When the N bits stored in the register 15 have stabilized, a LATCH signal enables latch circuits 17 to simultaneously store in parallel the N bits of data from register 15.

Once the N bits of data from register 15 are stored in latch circuits 17, another line of N bits of serial data can be sequentially clocked into shift register 15.

The N bits of data stored in latch circuits 17 are respectively applied in parallel over lines $L_1$-$L_N$ to first inputs of AND gates $G_1$-$G_N$. These N bits of data determine which ones of the thermal resistive elements $R_1$-$R_N$ will be activated when a high STROBE pulse is commonly applied to second inputs of the AND gates $G_1$-$G_N$. More specifically, only those of the lines $L_1$-$L_N$ that are high (logical 1) will activate their associated ones of the elements $R_1$-$R_N$ to thermally print when the STROBE pulse is high. For example, if the binary bit on line $L_3$ is high, it will be ANDed in AND gate $G_3$ with the common STROBE pulse and turn on transistor $Q_3$, causing current to flow through thermal resistive element $R_3$ for the length of time, t, controlled by the width of the STROBE pulse. The resulting $I^2Rt$ energy dissipated by element $R_3$ causes a dot to be thermally printed at that $R_3$ location on the recording medium or document being utilized.

To illustrate a problem associated with the prior art thermal line printer of FIG. 1, suppose that N=320. This means that the line printer of FIG. 1 has a row or line of 320 thermal resistive elements $R_1$-$R_{320}$ to print dot matrix characters. Further suppose that these characters are a maximum of 14 dots wide with an unused gap between character columns of, for example, 5 dots. Thus, the maximum number of characters that can be printed with such an exemplary 320 element printhead is 17.

Figure 2:
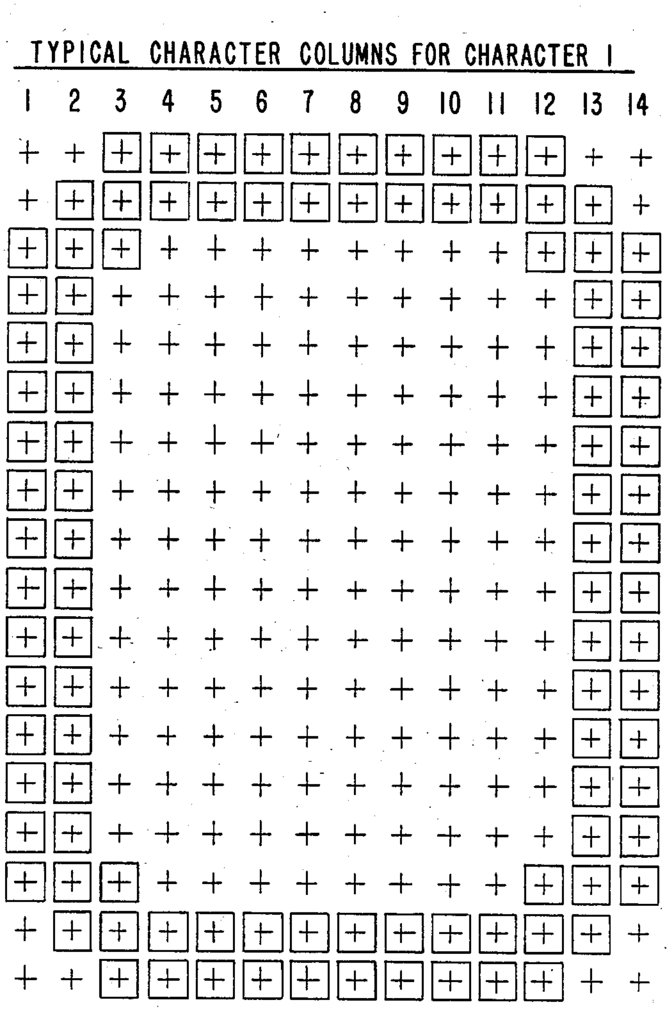
FIG. 2 illustrates typical character columns for a 14-dot wide first character that, in a conventional thermal line printer, always use associated thermal printhead elements 1–14.

FIG. 2 illustrates an exemplary first character (0) of these 17 characters—showing the first 14 element dots (derived from elements $R_1$-$R_{14}$ in FIG. 1) typically assigned to individual character column 1-14. The unused 5 dot space (character columns 15-19) between characters 1 and 2 is not shown. Thermal resistive elements $R_1$-$R_{320}$ are respectively assigned to character columns 1-320 (not shown).

The important concept here is that with conventional thermal line printers, like that shown in FIG. 1, the character positions on the thermal printhead 11 are fixed. That is, character 1 will always use thermal resistive elements $R_1$-$R_{14}$, character 2 will always use thermal resistive elements $R_{20}$-$R_{33}$, character 3 will always use thermal resistive elements $R_{39}$-$R_{52}$, and so forth.

The problem with such a conventional thermal line printer having fixed character positions is that the printer essentially operates as an "open loop" system. In such an open loop system, when a thermal resistive element eventually burns out (and becomes unusable) there is no way for the system to detect and/or correct for the failure of that element. Only after the operator of the thermal line printer notices a "hole" appearing in some of the printed characters can the printer be shut off and the whole thermal printhead be replaced. For example, if element $R_3$ (FIG. 1) burns out, the third column of the O character in FIG. 2 would not be thermally printed, creating "holes" in that character in the top and bottom character bar segments shown in character column 3.

Character "holes" or gaps are unacceptable for, for example, such financial fonts as E13B, CMC7, OCRA and OCRB, since erroneous print can cause either document rejects which are costly to correct or character misreads which could be potentially more serious. Furthermore, after a printhead with a burned-out element is eventually detected by an operator who observes the erroneous print, a costly and time consuming replacement of the defective printhead by a skilled technician will follow. The time involved in replacing the defective printhead is especially critical in the financial/banking industry, where critical time deadlines must be met on a daily basis.

Figure 3:
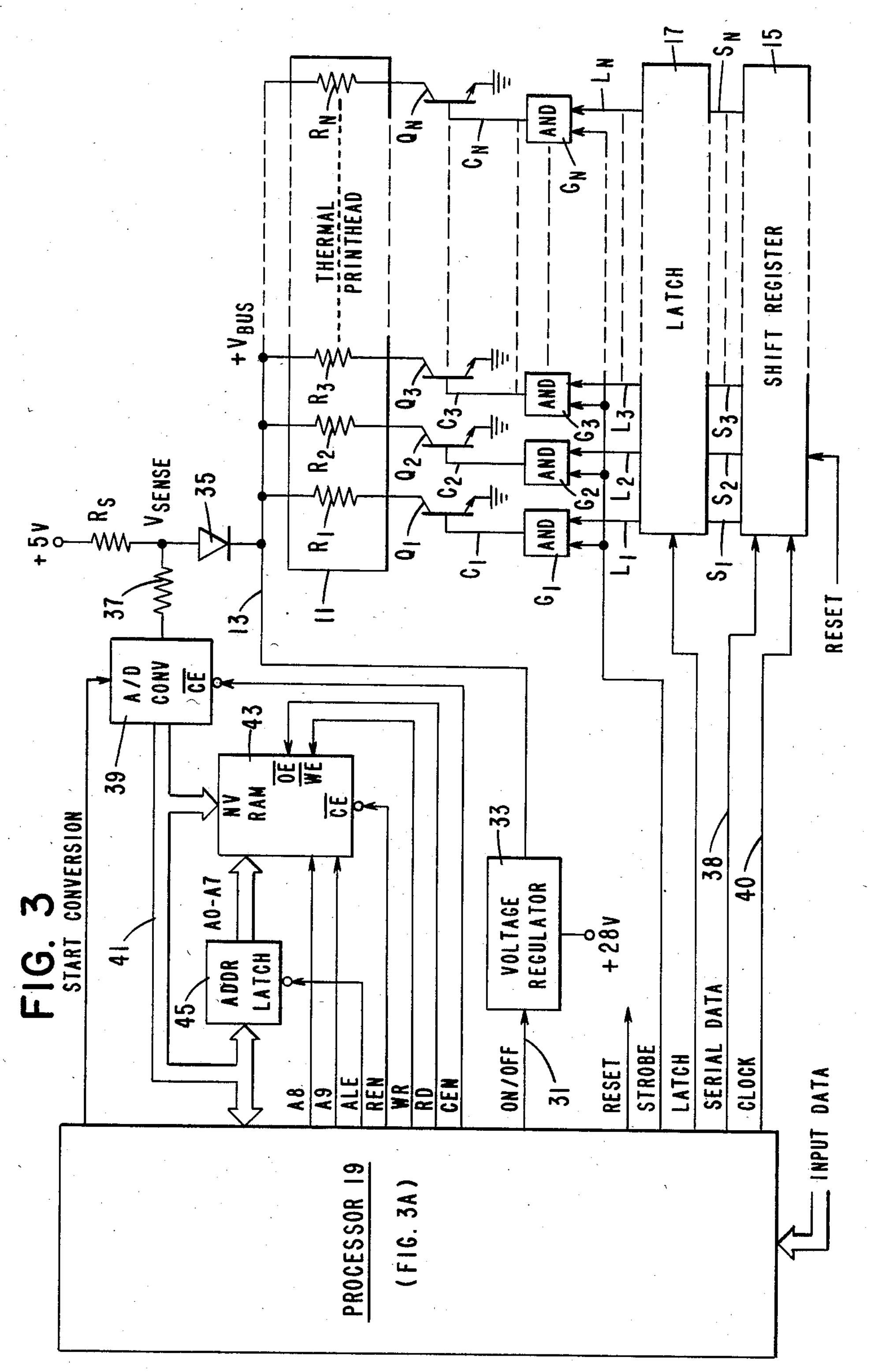
FIG. 3 is a schematic block diagram of a preferred embodiment of the thermal line printer of the invention.
Figure 3A:
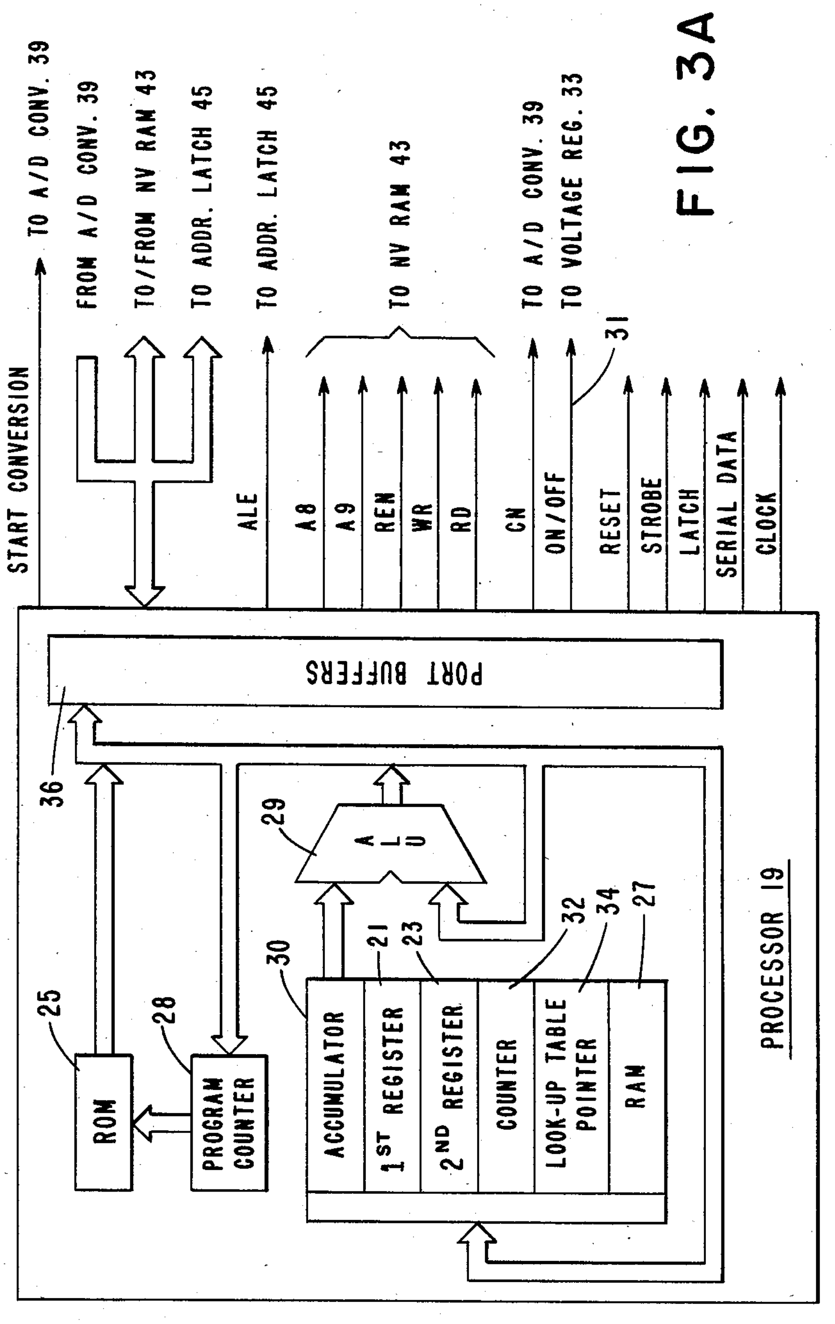
FIG. 3A is a schematic block diagram of the processor of FIG. 3.

Referring now to FIGS. 3 and 3A, a preferred embodiment of the thermal line printer of the invention is disclosed for minimizing the problems discussed in relation to the conventional thermal line printer of FIG. 1.

For purposes of this description, the thermal line printer of FIG. 3 includes the shift register 15, lines $S_1$-$S_N$, latch circuits 17, lines $L_1$-$L_N$, AND gates $G_1$-$G_N$, lines $C_1$-$C_N$, driver transistors $Q_1$-$Q_N$, thermal printhead 11 (with thermal resistive or heater elements $R_1$-$R_N$) and the $+V_{BUS}$ line 13 of FIG. 1. These above-identified structural elements of FIG. 3 are similar in structure, structural interconnection and operation to those of the correspondingly numbered structural elements described in relation to FIG. 1 and, hence, require no further description.

The thermal line printer of FIG. 3 operates as a "closed loop" system which automatically detects and then automatically compensates for at least the first defective (burned out or marginal) one of the elements $R_1$-$R_N$ in the thermal printhead 11. More specifically, the "closed loop" system of FIG. 3 automatically detects a defective one of the elements $R_1$-$R_N$ prior to the time that that defective element becomes unusable, and then automatically corrects for at least the first defective element by altering the "fixed" character positions along the length of the printhead 11 by a software shift operation which alters the relative position of the character columns and gaps in the stream of serial data applied to the shift register 15.

In addition, the automatic detection of a defective, but still usable, element permits the operator to be notified of the impending failure of an element well in advance of the time that the printhead becomes unusable. Such an early notification of the impending failure of an element allows the operator to summon a technician to replace the thermal printhead 11 during a non-peak, down-time period.

The system of FIG. 3 includes a processor 19, which is shown in more detail in FIG. 3A, for selectively controlling the operation of the system. The processor 19 can be a computer, microprocessor or any other suitable computing device. For purposes of this description, the processor 19 is an 8051 microprocessor manufactured by Intel, Santa Clara, Calif. As shown in FIG. 3A, the microprocessor or processor 19 includes a first register 21, a second register 23, a read only memory (ROM) 25 which stores the software program to be performed, a random access memory (RAM) 27 for temporarily storing data, and an arithmetic logic unit (ALU) 29, controlled by the software program in the ROM 25, for performing arithmetic operations and generating signals to control the operations of the processor 19. In addition, the microprocessor or processor 19 includes additional circuits, such as a program counter 28 controlled by the ALU 29 for accessing the main program and various subroutines in the ROM 25, an accumulator 30, a counter 32, a lookup table pointer 34 and port buffers 36. The lookup table pointer 34 is under the software control of the program in the ROM 25 to selectively develop an output address (A0-A9) and to selectively provide a reference to defective element positions.

The operation of the system of FIG. 3 has two phases. In the first phase of operation, the thermal resistive elements $R_1$-$R_N$ are periodically tested in order to detect a defective element. In the second phase of operation, the relative positions of the character columns and gaps in the serial stream of data for a line to be thermally printed are altered to correct for a defective element. These two phases of operation will now be discussed.

ELEMENT TESTING

Initially, the processor 19 applies an OFF signal to ON/OFF line 31 to turn off a voltage regulator 33, thus preventing the voltage regulator 33 from applying a +20 V regulated voltage to the $+V_{BUS}$ line 13 and to the thermal printhead resistive elements $R_1$-$R_N$. The turning off of the voltage regulator 33 forward biases a diode 35, which has its cathode coupled to the $V_{BUS}$ line 13 and its anode coupled through a sensing resistor $R_S$ to a +5 V potential. With diode 35 forward biased, a voltage divider can be formed between sensing resistor $R_S$ and the parallel combination of any of the thermal resistive elements $R_1$-$R_N$, which can be controllably activated by selectively enabling the associated one of the driver transistors $Q_1$-$Q_N$.

For testing purposes, only one of the thermal printhead elements $R_1$-$R_N$ is activated or turned on at any given time. This is accomplished by the processor 19 outputting serial data onto a SERIAL DATA line 38 and associated clock pulses onto a CLOCK line 40. The serial data contains only one "1" state bit which is associated in position within the serial data to the position of the element in the printhead 11 that is to be tested, with the remaining N−1 bits in the serial data being "0" state bits.

The serial data containing only one "0" state bit is clocked from the line 38 into the shift register 15 by means of the clock pulses on line 40. The position of this "1" state bit in the serial data in register 15 corresponds to tbe position of the element in the printhead 11 that is to be tested. This "1" state bit in the register 15 is latched into latch circuits 17 by a LATCH pulse. That latched "1" state bit, which is now at an associated one of the outputs $L_1$-$L_N$ of latch circuits 17, is then used to enable the associated one of AND gates $G_1$-$G_N$, at the time of a STROBE pulse, to activate the desired one of the elements $R_1$-$R_N$ by turning on the associated one of the transistors $Q_1$-$Q_N$. For example, if element $R_1$ is to be tested, only the last bit clocked into the register 15 would be a "1" state bit. This "1" state bit would be applied via line $S_1$, to latch circuits 17 and latched therein by a LATCH pulse. This "1" state bit in latch circuits 17 would be applied via line $L_1$ to enable AND gate $G_1$ at the time of the STROBE pulse to turn on transistor $Q_1$ and thereby activate element $R_1$ to be tested.

To test a given one of the elements $R_1$-$R_N$, a sense voltage, $V_{sense}$, is measured or sensed at the junction of sensing resister $R_S$ and diode 35. The amplitude of the $V_{sense}$ voltage for an element being measured or tested is a function of the resistance value of that thermal printhead element. The value of $V_{sense}$ is given by the mathematical equation:

$$V_{sense} = \left[\frac{5 - V_{D1} - V_{QTPH}}{R_S + R_{TPH}}\right] \cdot R_{TPH} + V_{D1} + V_{QTPH}$$

where:

$V_{D1}$ = voltage drop across diode 35 (typically 0.2 V to 0.3 V for a germanium diode)

$V_{QTPH}$ = voltage drop across whichever one of the driver transistors $Q_1$-$Q_N$ is turned on and in a saturated condition (typically 0.2 V)

$R_{TPH}$ = resistance of whichever one of the thermal printhead elements $R_1$-$R_N$ has been selected for testing $R_S$ = resistance of sensing resistor $R_S$ Thus, during an initial test mode of operation, an initial reference analog sense voltage, $V_{sense}$, can be determined for each of the thermal resistive elements $R_1$-$R_N$ in the thermal printhead 11, applied through a resistor 37 to the input of an analog-to-digital converter (A/D CONV.) 39. Upon receiving a START CONVERSION signal from the processor 19, after a $V_{sense}$ signal is determined, the A/D converter 39 digitizes the analog $V_{sense}$ signal. The processor 19 then applies a CEN (converter enable) pulse to the A/D converter 39 which causes the digitized $V_{sense}$ signal to be transferred via data bus 41 to the accumulator 30 (FIG. 3A) in the processor 19 and to the data input of a conventional non volatile RAM (NV RAM) 43. Upon receiving a RAM enable (REN) signal and a low write (WR) signal from the processor 19, the digitized $V_{sense}$ signal is transferred from the accumulator 30 (FIG. 3A) of the processor 19 via the data bus 41 to the associated memory location of the NV RAM 43 determined by the memory location address A0–A9 from the processor 19.

Before each $V_{sense}$ voltage is determined, address bits A0–A7 are applied from processor 19 via data line 41 to input of an address latch 45. The processor 19 then applies an address latch enable (ALE) pulse to the latch 45 to latch the A0–A7 bits into the latch 45. The address bits A0–A7 at the output of latch 45 combine with the simultaneously developed address bits A8 and A9 from the processor 19 to form the appropriate memory location address of the NV RAM 43, into which the associated initial $V_{sense}$ signal is stored. At this time, a low WR (write) signal and a high RD (read) signal from the processor 19 are respectively applied to the $\overline{WE}$ (write enable) and $\overline{OE}$ (output enable) inputs of the NV RAM 43. The low WR signal enables the sequence of input digitized $V_{sense}$ measurements on data line 41 to be respectively written into the memory location addresses of the NV RAM 43 indicated by the address bits A0–A9. On the other hand, the high RD signal prevents data from being read from the NV RAM 43. Thus, the processor 19 stores the initial $V_{sense}$ measurement or signal for each of the elements $R_1$–$R_N$ in the thermal printhead 11 in the NV RAM 43.

As mentioned before, the amplitude of the $V_{sense}$ voltage for an element being tested or measured corresponds to, and is a function of the resistance value of that element. Therefore, the terms "$V_{sense}$ measurement of an element" and "resistance measurement of an element" will henceforth be used interchangeably in this description to mean the same thing. Thus, the initial resistance values of the elements $R_1$–$R_N$ are stored in the NV RAM 43.

Figure 6A:
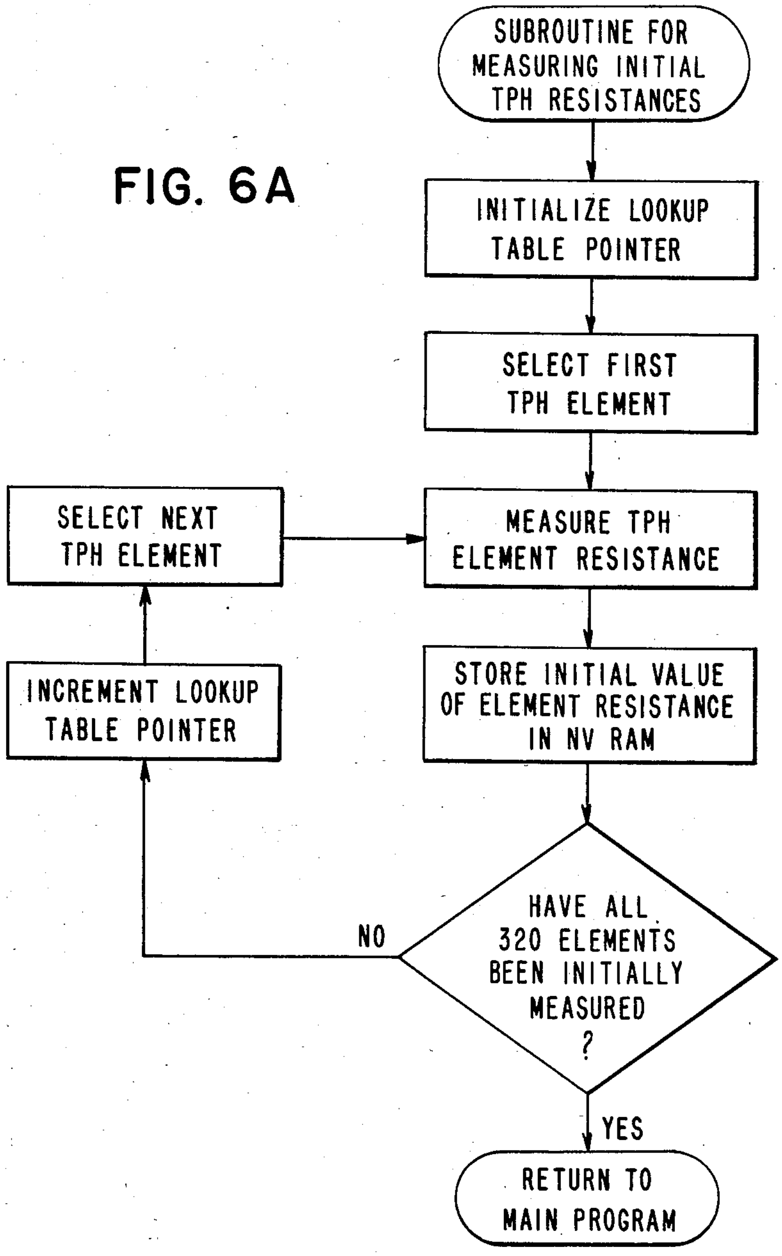
FIGS. 6A–6E illustrate flow charts useful in explaining the operation of the preferred embodiment of the thermal line printer of FIG. 3.

As will be discussed later, FIG. 6A illustrates a flowchart which describes the software subroutine that is used to perform these initial measurements of the elements $R_1$–$R_N$ in the thermal printhead 11.

The initial $V_{sense}$ measurement or signal for each of the elements $R_1$–$R_N$ is used to establish an initial reference value for determining whether or not a subsequent corresponding $V_{sense}$ measurement indicates a defective thermal resistive element. In explanation, it should be noted that the failure mode for each of the thermal printhead resistive elements $R_1$–$R_N$ is a gradual process with each element becoming "more damaged" with each successive pulse of current that is passed through it. As indicated in FIG. 3, as the resistance of a resistive element increases (or decreases), its associated $V_{sense}$ value increases (or decreases) as a function of such change in resistance. Thus, a $V_{sense}$ measurement of an element is effectively a measurement of the resistance of that element.

Figure 4:
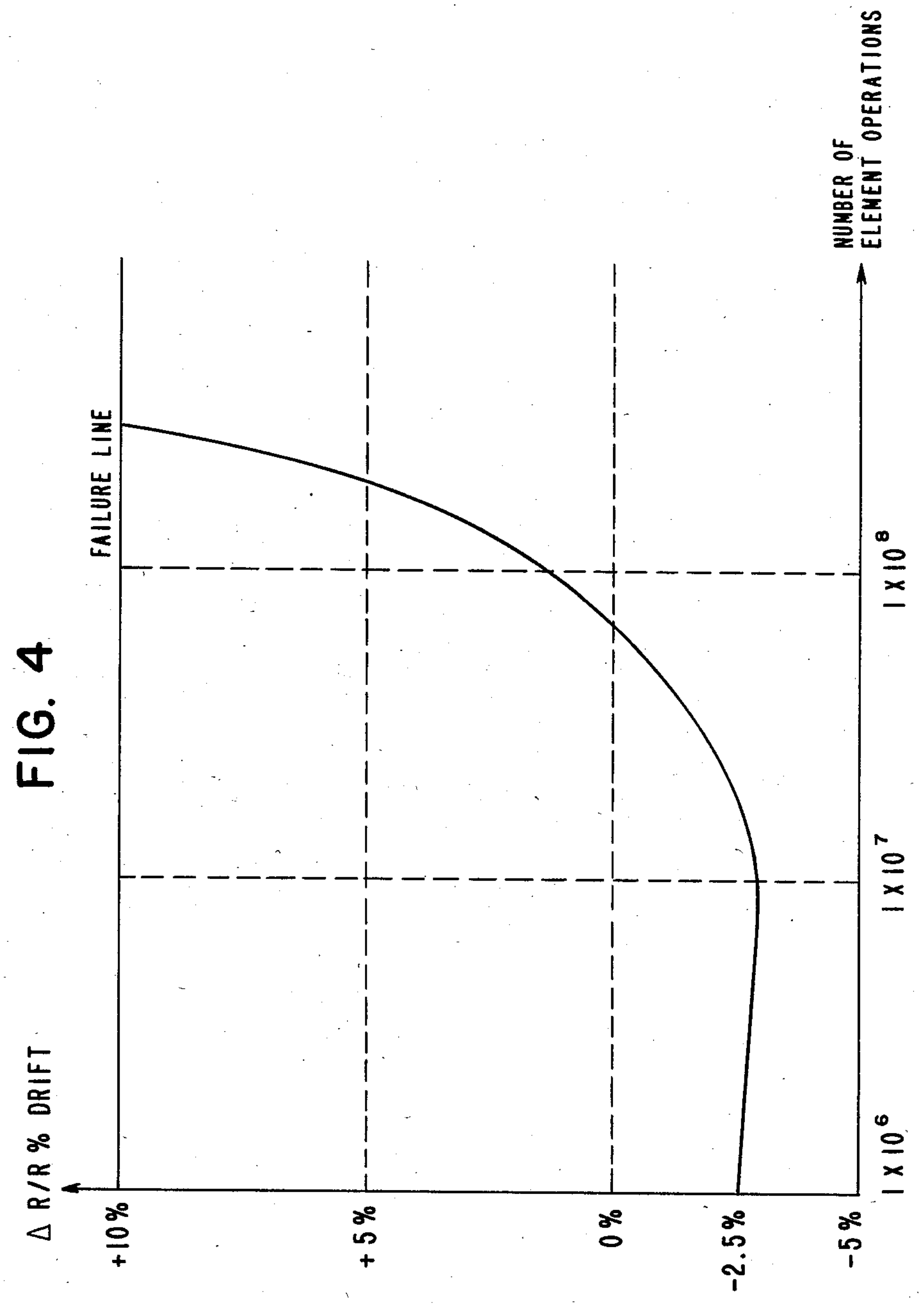
FIG. 4 illustrates a graph of percent change in a representative printhead element resistance (ΔR/R % DRIFT) versus the number of printhead operations for that element.

FIG. 4 shows a graph of percent change in a representative printhead element resistance, or $\Delta R/R$ % drift, versus the number of printhead operations for that element, starting after $1\times10^6$ pulses have been previously applied to that element. At this starting point, it can be seen that the resistance of the element has decreased about 2.5% from the initial measurement of 0%.

Since, once an element starts to fail, this element resistance change curve of FIG. 4 is reasonably consistent for each of the elements $R_1$–$R_N$ in the printhead 11, the progress of the resistance change for each element can be tracked during the life of the printhead 11 and, just prior to or at the time that the resistance of an individual element reaches +10% from the initial reference value of that element, the system of FIG. 3 can be alerted so that remedial action can be taken.

Returning now to FIG. 3, after the initial N resistive elements $R_1$–$R_N$ have been measured and their digitized values stored in the NV RAM 43, an ON signal is applied from the processor 19 to the ON/OFF line 31 to turn on the voltage regulator 33. When turned on, the voltage regulator 33 utilizes an input +28 V to develop and apply a +20 V to the $+V_{BUS}$ line 13. This +°V back biases the diode 35, preventing any $V_{sense}$ measurements from being taken. The thermal printhead 11 can now be used for a normal printing operation, with serial data related to the next line to be thermally printed being serially loaded into the shift register 15, then latched into latch circuits 17 to selectively enable associated ones of the AND gates $G_1$–$G_N$ to turn on associated ones of transistors $Q_1$14 $Q_N$. In this manner, the resistive elements $R_1$–$R_N$ are selectively activated to thermally print out dots corresponding to the serial data previously stored in the shift register 15.

After the normal printing operation is initiated, the resistances of the resistive elements $R_1$–$R_N$ can be periodically measured (as discussed before) and compared to their corresponding initial reference values. Such measurements can be made at specified times, such as every hour or every day. At each specified time, the processor 19 applies an OFF signal to the ON/OFF line 31 to turn off the voltage regulator 33 and forward bias the diode 35 to start the test mode of operation. The processor 19 then outputs only one "1" state bit of data in each stream of serial data applied to SERIAL DATA line 36 in order to test or measure each of the elements $R_1$–$R_N$, in the same manner previously discussed. In an alternative arrangement, the "1" state bit of data that was loaded in the associated position of the shift register 15 that corresponds to element $R_1$ can be incrementally shifted through the shift register 15 to test or measure each of the elements $R_1$–$R_N$ in the thermal printhead 11.

For each subsequent measurement of one of the elements $R_1$–$R_N$, a CEN pulse from the processor 19 enables the A/D converter 39 to output the corresponding digitized $V_{sense}$ value. That digitized value for an element is then read into the processor 19 and stored in first register 21. The NV RAM 43 is then accessed with the appropriate address bits A0–A9 and enabled by a low RD signal to read out the corresponding initial resistance value for that element. This initial resistance value for that element is then loaded into the second register 23 of the processor 19 (FIG. 3A). A software subroutine (FIG. 6B) in the ROM 25 is then called to compare the corresponding initial and current values for an element to determine whether the current value of the thermal printhead element being measured exceeds its initial value by +10%. In this manner, each of the resistances of the elements $R_1$–$R_N$ is selected, measured and compared with its associated initial reference value.

CORRECTION FOR DEFECTIVE ELEMENT

Eventually, when the first burned out or defective element is detected by such comparisons, the processor 19 will know specifically which element has a resistance change of 10% or more from its initial reference value. A software subroutine (FIG. 6D) in the ROM 25 is then called to work out how to position or change the character and gap positions in the stream of serial data so that the defective element is located in the gap between adjacent character positions in the serial data.

Figure 5A:
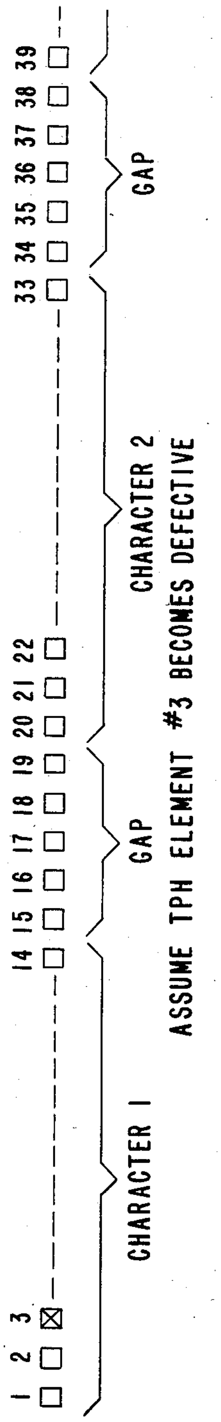
FIG. 5A shows the character positions for characters 1 and 2 at the time that a defective element $R_3$ is first detected.
Figure 5B:
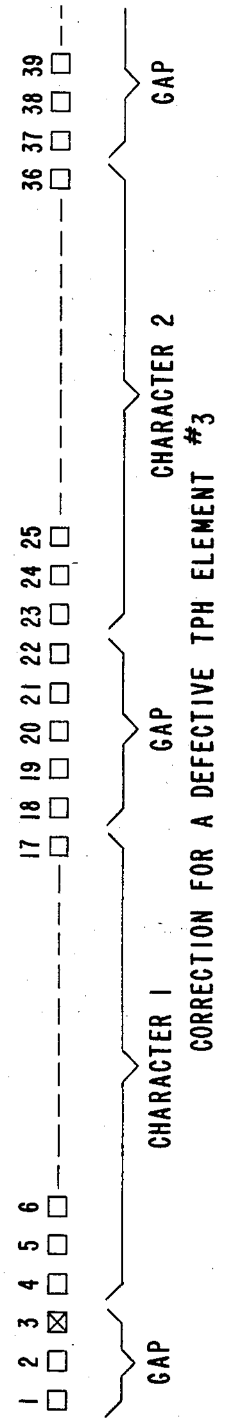
FIG. 5B shows the character positions of characters 1 and 2 after there is a software controlled shift of character positions within a line of serial data in order to compensate for the defective element $R_3$.

FIGS. 5A and 5B, respectively, show a "before" and "after" scenario illustrating the software shift of data about a defective element, where element $R_3$ is assumed to be defective. More specifically, FIG. 5A shows the character positions for characters 1 and 2, as well as the gap therebetween, at the time that a defective element $R_3$ is first detected. FIG. 5B shows the character positions of characters 1 and 2 after there is a software controlled shift of character positions within a line of serial data in order to compensate or correct for the defective element $R_3$.

For such a correction technique to work, it is required that the thermal printhead 11 contain at least as many extra resistive elements as the width of the characters being thermally printed. As indicated in FIG. 5A, it is assumed that at least the last 14 elements in the printhead 11 are extra (not used). It should, of course, be realized that the extra elements could have been positioned elsewhere along the row of elements $R_1$–$R_N$ in the printhead 11. For example, the first 14 elements or the 7 elements at the start and the 7 elements at the end of the printhead 11 could have been selected as the extra elements.

In an exemplary 320 element thermal printhead 11 havin 14-element wide characters with a gap of 5 elements between adjacent characters, a total of 16 characters can be printed in a line with, for example, the 11 elements at the start and the 10 elements at the end of the printhead being extra elements.

It should be noted at this time that the correction technique described above is guaranteed to work for the first defective element. Whether or not it works for a subsequently detected defective element (or elements) is dependent upon the position of that subsequently detected defective element and/or the number of extra elements allowed in the printhead 11. It should be realized that the thermal printer will continue to operate, regardless of the number of defective elements, as long as all of the defective elements can be repositioned in one or more of the gaps between characters. As soon as all of the defective elements cannot be repositioned in the gaps between characters, the processor 19 applies an OFF signal to ON/OFF line 31 to turn off the voltage regulator 33 and, hence, turn off the printhead 11 to prevent any further printing with that defective printhead 11. In most circumstances, it would be more advantageous for an operator of the thermal printer to summon a skilled technician to replace a defective thermal printhead 11, as soon as a defective element is detected, in order to avoid an unnecessary and costly downtime. In any event, the system of FIG. 3 allows the continued use of the printhead 11 after the first defective element is detected and also provides the operator with sufficient time to have a defective printhead 11 replaced during a convenient non-peak time period.

In an alternative approach for establishing an initial reference value for the elements $R_1$–$R_N$ one predetermined maximum value of resistance could be used for all of the elements $R_1$–$R_N$. That predetermined maximum value could be written into a software subroutine (FIG. 6C) in the ROM 25 (FIG. 3A). Then, the measured value of each element in the first register 21 (FIG. 3A) is compared to that predetermined maximum value. Whenever the measured value of an element exceeds this predetermined maximum value, a defective element is detected and a data shift will then be performed (FIGS. 6D and 6E).

For a more detailed description of the step-by-step sequence involved in the operation of the system of FIG. 3, reference is now made to the subroutines shown in FIGS. 6A–6E. These subroutines show the essential operational steps that are involved in the ELEMENT TESTING and CORRECTION FOR DEFECTIVE ELEMENT phases of operation of the system of FIG. 3. As previously indicated, these operational steps are controlled by the processor 19 during the execution of the software program that is contained in the ROM 25. For each of the subroutines in FIGS. 6A–6E, the system operation moves from the execution of the main program to that subroutine and then, after completing that subroutine, moves back to the main program.

FIG. 6A shows a subroutine for measuring the initial thermal printhead (TPH) resistances of the elements $R_{1-RN}$.

The first step in this subroutine is to initialize the lookup table pointer 34 (FIG. 3A) in the processor 19 (which in this description is an exemplary Intel 8051 microprocessor). This step merely sets the address bits A0–A9 from the processor 19 to the predetermined first address location in the NV RAM 43 where the initial reference value of element $R_1$ is to be stored.

Initially, all of the thermal printhead element positions $R_1$–$R_N$ in the shift register 15 are set to "0" states. The first thermal printhead element, position R1, is then selected by clocking a single "1" state bit into the shift register 15.

Next, the TPH element resistance of $R_1$ is measured by developing an initial $V_{sense}$ measurement or value for the element $R_1$ at the output of the A/D converter 39. This initial value of $R_1$ is then stored or written into the NV RAM 43 at the address indicated by address bits A0–A9.

The subroutine then determines if the initial values for all of the exemplary 320 elements in the printhead 11 have been done. (Note that the printhead 11 is not limited to 320 elements but can contain any desired number of elements, depending on which specific printhead is being used). Since only the resistance of the first element $R_1$ has been measured, the subroutine enters a loop in which it increments the lookup table pointer 34 (FIG. 3A) to the next address for the NV RAM 43, selects the next TPH element ($R_2$), measures the TPH element resistance of the next element ($R_2$), stores the initial value of that next element ($R_2$) in the NV RAM 43 and again determines if all 320 elements have been initially measured. The subroutine continues in this loop until all 320 elements have been initially measured. At this time, the operation is returned to the main program.

Figure 6B:
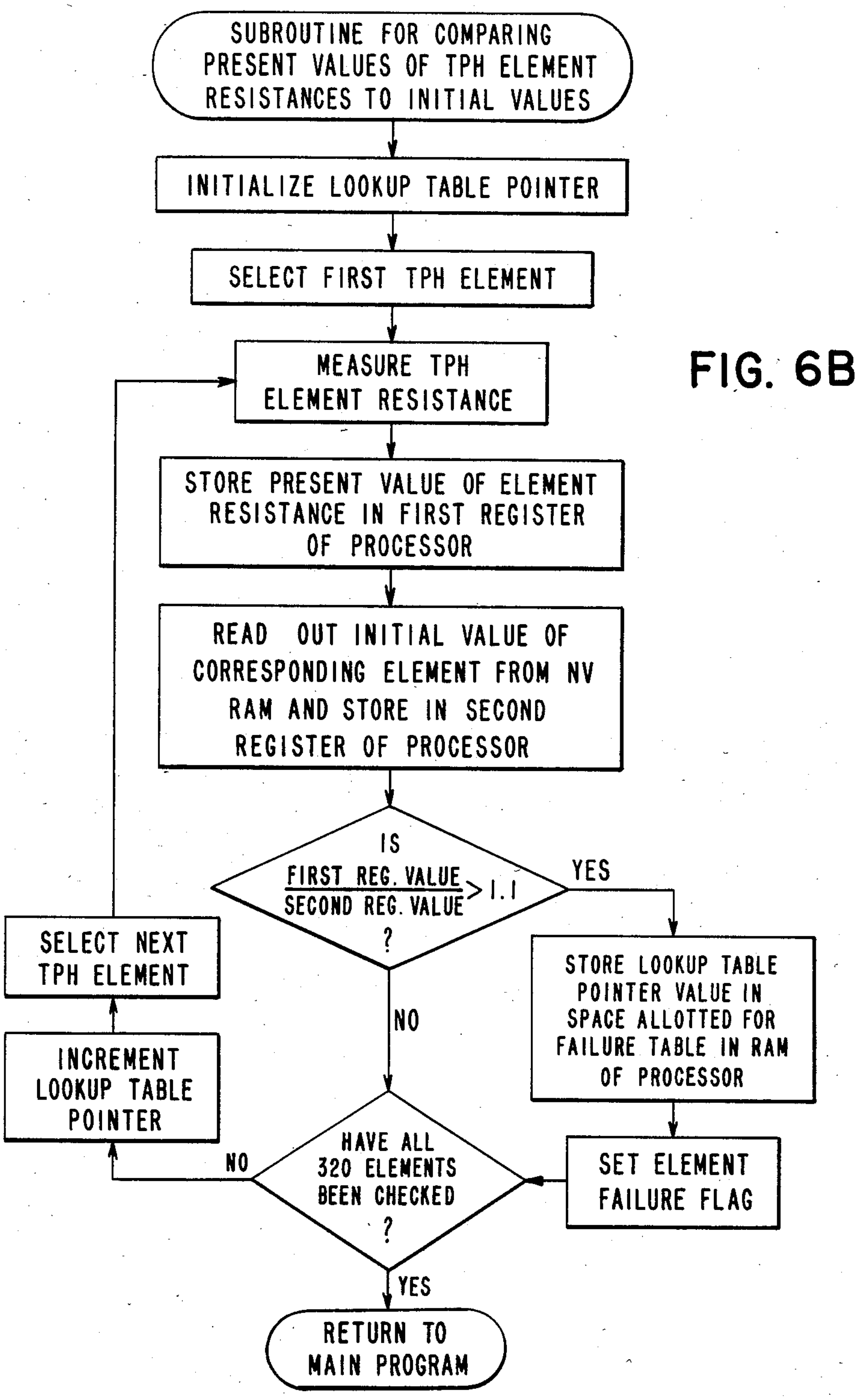

FIG. 6B shows a subroutine for comparing the presently measured value of the resistance of each of the TPH elements $R_1$–$R_N$ to the associated initial value of resistance for that element in order to detect a defective element.

The first step in this subroutine is to initialize the lookup table pointer 34 (FIG. 3A) in the processor 19 to the address location in the NV RAM 43 where the initial reference value of element $R_1$ is stored. Then, the first TPH element $R_1$ is selected. The resistance of that selected TPH element is then measured by developing a present digitized $V_{sense}$ value for that element at the output of A/D converter 39.

The present digitized $V_{sense}$ value for that element ($R_1$) corresponding to the present resistance value of that element ($R_1$) is outputted from the A/D converter 39 and stored into the first register 21. Using the lookup table address, the initial resistance value of the corresponding element ($R_1$) is read out from the NV RAM 43 and stored in second register 23.

The subroutine then decides whether the present resistance value or measurement of that element is acceptable by performing a software comparison to determine if the present value of resistance stored in first register 21 exceeds the initial value of resistance stored in second register 23 by more than ten percent (10%).

If the resistance of that element has not been increased by more than 10% over its initial value, that element is still functional and the subroutine then determines if all 320 elements in the printhead 11 have been checked for a resistance increase of over 10% from their corresponding initial resistance values.

If all 320 elements have not been checked, the subroutine enters a loop in which it increments the lookup table pointer 34 (FIG. 3A) to the next address for the NV RAM 43, selects the next TPH element, measures the present resistance of that TPH element, stores that present resistance value of that TPH element in first register 21, reads out the initial value of the corresponding element from the NV RAM 43 and stores that initial value in second register 23, and then determines if the resistance value of that element has increased by more than 10% over its initial value. If the resistance of that element has not increased by more than 10% and all 320 elements have not been checked, the subroutine continues in this loop until all of the 320 elements have been checked. After all 320 elements have been checked, the subroutine returns to the main program.

If the present resistance value of an element is greater than 10% more than the initial value for that element, then the subroutine branches from the above-described loop and stores the lookup table pointer value or memory location address of the defective element in an associated one of the spaces allotted for a failure table (not shown) in the RAM 27 of the processor 19. An element failure flag (bit) is then set to indicate to the main program in the ROM 25 (FIG. 3A) of the processor 19 that a defective element has been detected.

After the element failure flag is set, the subroutine re-enters the above-described loop to determine if all 320 elements have been checked. If all 320 elements have not been checked, the subroutine continues in the loop. If all 320 elements have been checked, the program returns from the subroutine to the main program.

Figure 6C:
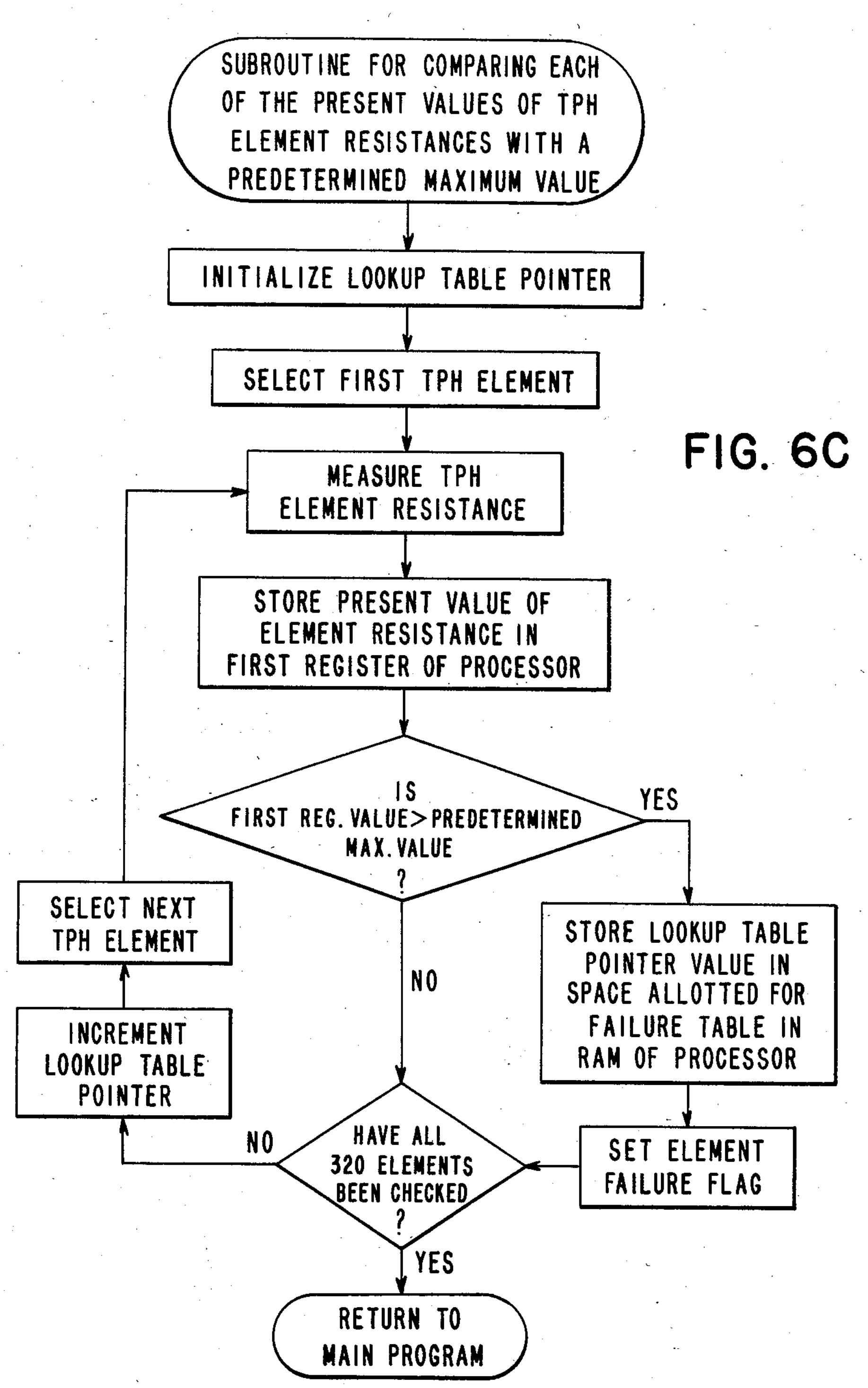
Figure 6D:
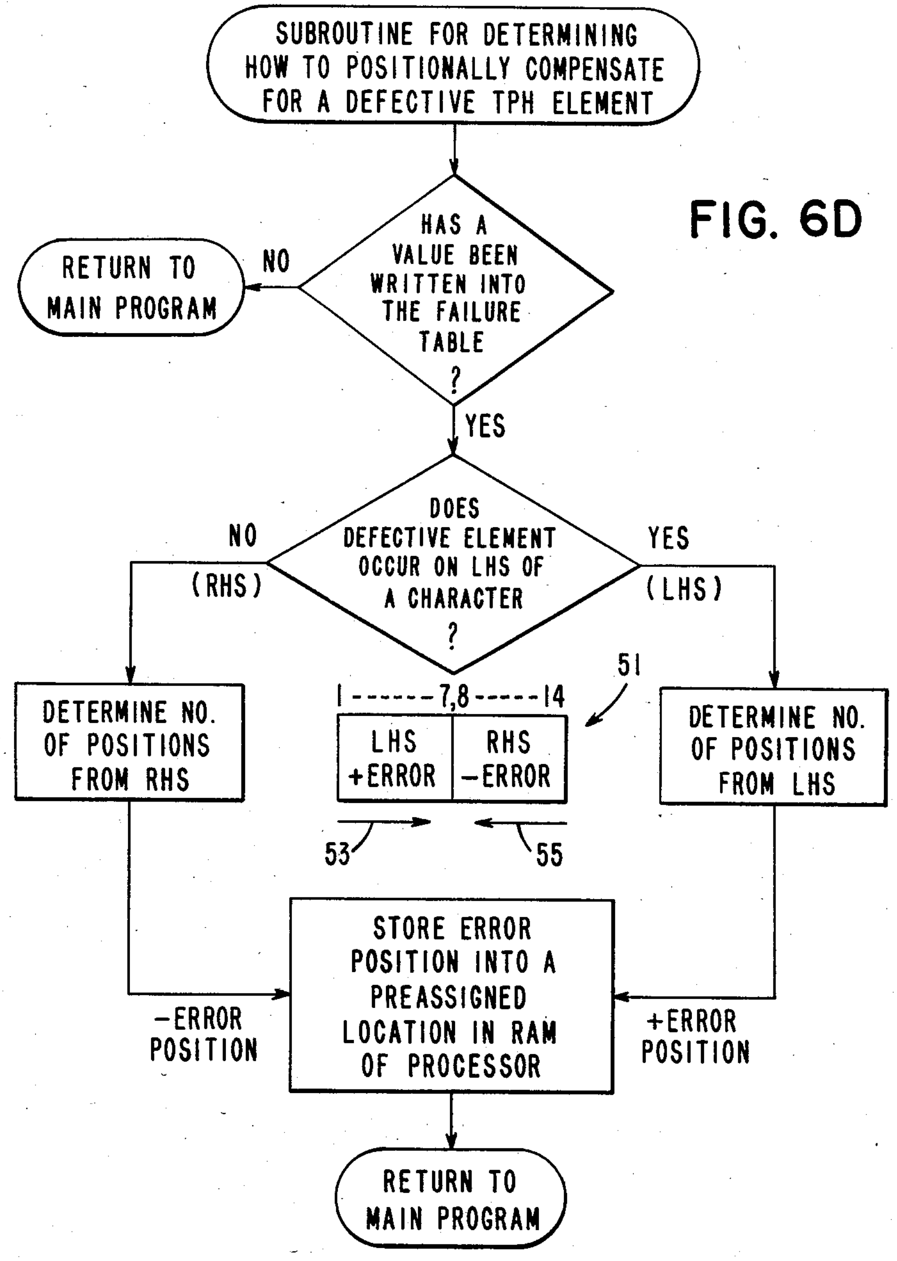
Figure 6E:
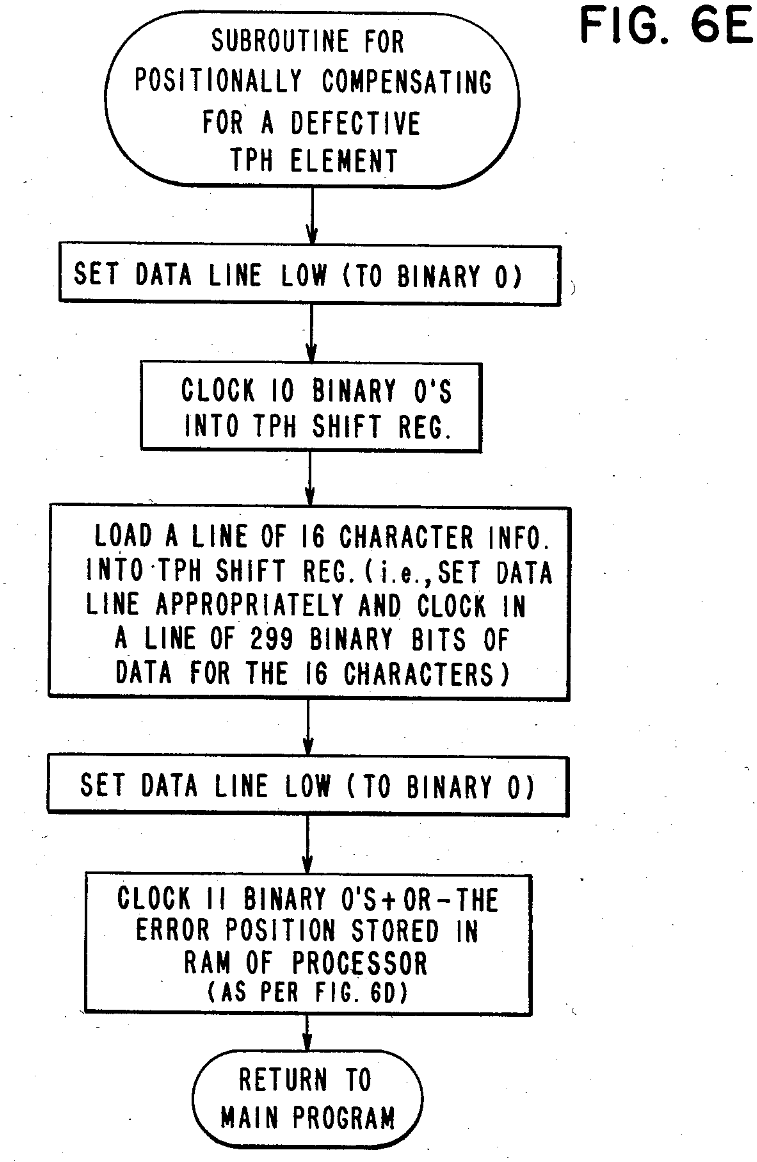

FIG. 6C shows a subroutine for comparing each of the present values of resistances of the TPH elements $R_1$-$R_N$ with a predetermined maximum value in order to detect a defective element.

It should be noted at this time that the subroutine of FIG. 6C differs from the combined subroutines of FIGS. 6A and 6B for detecting a defective element.

The subroutine of FIG. 6B is based on detecting a defective element by determining whether any of the resistances of the elements $R_1$-$R_N$ changes by more than 10% from the initial values of resistances of the corresponding elements, where the initial values for the elements $R_1$-$R_N$ were determined by the subroutine of FIG. 6A. In this first case, a resistance change of an element of more than 10% over its corresponding initial resistance value indicates the detection of a defective element.

On the other hand, the subroutine of FIG. 6C is based on detecting a defective element by determining whether the resistance of any of the elements $R_1$-$R_N$ is greater than a common predetermined maximum resistance value. In this second case, when the resistance of an element becomes greater than the predetermined resistance value, that element is determined to be defective.

These first and second cases are mutually exclusive. Either the subroutines of FIGS. 6A and 6B can be used or the subroutine of FIG. 6C can be used, but never all of these subroutines together.

The first step in the subroutine of FIG. 6C is to initialize the lookup table pointer 34 in the processor 19 to select the location of the first TPH element ($R_1$). Then, the first TPH element ($R_1$) is selected. The resistance of that selected TPH element ($R_1$) is then measured by developing a present digitized $V_{sense}$ value for that element at the output of the A/D converter 39.

The present digitized $V_{sense}$ value for that element ($R_1$), which corresponds to the present resistance value of that element ($R_1$), is then stored in the first register 21. A software comparison is then performed in which the subroutine determines whether the present value stored in first register 21 for that element ($R_1$) is greater than a predetermined maximum digital value, which corresponds to the predetermined maximum resistance value.

If the value stored in first register 21 is not greater than the predetermined maximum value, the subroutine then determines if all 320 elements in the printhead 11 have been individually checked against the predetermined maximum value for a defective element. If all 320 elements have not been checked, the subroutine enters a loop in which it increments the lookup table pointer 34, selects the next TPH element, measures the present resistance value of that TPH element, stores that present resistance value of that TPH element in first register 21, and then determines if the present resistance value of that element is greater than the predetermined maximum value. If the present resistance value of that element does not exceed the predetermined maximum value and all 320 elements have not been checked, the subroutine continues in this loop until all 320 elements have been checked. After all 320 elements have been checked, the subroutine returns to the main program.

If the present resistance value of an element is greater than the predetermined maximum value, the subroutine branches from the above-noted loop and stores the lookup table pointer value or memory location address of the defective element in an associated one of the spaces allotted for a failure table in the RAM 27. An element failure flag (bit) is then set to indicate to the main program in the ROM 25 (FIG. 3A) of the processor 19 that a defective element has been detected.

After the element failure flag is set, the subroutine re-enters the above-noted loop to determine if all 320 elements have been checked. If all 320 elements have not been checked, the subroutine continues in the loop until all 320 elements have been checked. At this time, the program returns from the subroutine to the main program.

FIG. 6D shows a subroutine for determining how to positionally compensate for a defective TPH element previously detected by either the combined subroutines of FIGS. 6A and 6B or by the subroutine of FIG. 6C.

Before proceeding with the explanation of the subroutine of FIG. 6D, a few comments will now be made.

It will be recalled that, in the exemplary 320 element printhead 11 being discussed, each character is a maximum of 14 dots wide with an unused gap of 5 dots between adjacent characters. With such parameters, a maximum of 16 characters can be printed with this exemplary printhead 11. With 16 characters across, 21 elements in the printhead 11 are extra or unused. This number of extra elements meets the requirement that there be at least 14 extra elements in the exemplary printhead 11 to enable the correction technique of the invention to work.

Assume that the software program in the ROM 25 sets the initial format of the serial (character) data from the processor 19 such that the 11 elements $R_1$–$R_{11}$ on the left-hand side (LHS) of the printhead 11 and the 10 elements $R_{311}$–$R_{320}$ on the right-hand side (RHS) of the printhead 11 are extra elements.

With the positions of the 16 characters initially fixed in character width, gap between adjacent characters and placement of the extra elements, as described above, the exact position of a defective element with a character can be readily determined. For example, if element $R_{42}$ became defective, the system of FIG. 3 would know that elements $R_1$–$R_{11}$ were initially set up to be extra or unused elements, elements $R_{12}$–$R_{25}$ were initially assigned to character 1, elements $R_{26}$–$R_{30}$ were the unused elements in the gap between characters 1 and 2, elements $R_{31}$–$R_{44}$ were initially assigned to character 2, and so forth. Therefore, the system would also know that defective elemen 42 would be the twelfth element in character 2.

As indicated in insert 51 in FIG. 6D, the first 7 elements assigned to a 14-dot wide character are on the left-hand side (LHS) of that character, while the remaining 7 elements assigned to that character are on the right-hand side (RHS) of that character. A defective element on the LHS would constitute a positive (+) error and would ultimately require a right-hand shift of the serial data by the number of positions of the defective element from the LHS of the character, as indicated by arrow 53, in order to effectively place the defective element in the gap between adjacent characters. Similarly, a defective element on the RHS would constitute a negative (−) error and would ultimately require a left-hand shift of the serial data by the number of positions of the defective element from the RHS of the character as indicated by arrow 55, in order to effectively place the defective element in the gap between adjacent characters.

Initially, the subroutine of FIG. 6D determines whether a lookup table pointer value has been written into the failure table (not shown) of the RAM 27 by checking the element failure flags. If no element failure flag is set, the subroutine will return to the main program. This is due to the fact that, if there is no element failure, all of the elements in the printhead 11 are good and there is no defective TPH element to positionally compensate for.

If an element failure flag has been set, then some memory location address has been written into the failure table of the RAM 27. It is now necessary to find out exactly where the defective element is located in a character. To accomplish this task, the subroutine determines whether the defective element occurs on the LHS of a character. How such a determination is made has been previously discussed.

If the defective element occurs on the LHS of the character, the subroutine determines the number of positions of the defective element from the LHS of the character. This number of positions from the LHS is a +error position value which is then stored in a preassigned location in the RAM 27 of the processor 19 before the subroutine returns to the main program.

If the defective element occurs on the RHS of the character, the subroutine determines the number of positions of the defective element from the RHS of the character. In this case, the number of positions from the RHS is a − error position value which is then stored in the preassigned location in the RAM 27 before the subroutine returns to the main program.

FIG. 6E shows a subroutine for positionally compensating for a defective TPH element.

The first step in this subroutine is to set the SERIAL DATA line 38 between the processor 19 and the shift register 15 to a 0 state or binar 0 value. Then, 10 binar 0's are sequentially clock into the shift register 15. Next, a line of 16 character information or 299 bits of serial data is applied to SERIAL DATA line 38 and sequentially clocked into the shift register 15. This serial data causes the initial 10 binary 0 bits to be clocked 299 additional positions into the shift register 15. The SERIAL DATA line 38 is once again set to a state or binary 0 value. The subroutine then clocks into the shift register 15 a number of binary 0's equal to the algebraic sum of 11 and the (+ or −) error position stored in the RAM 27 (FIG. 3A), before returning to the main program.

To illustrate the latter binary 0 clocking step in the subroutine of FIG. 6E, assume that element $R_{42}$ was defective, as discussed before. The subroutine of FIG. 6D would have previously determined that defective element $R_{42}$ is the twelfth element in character 2, is on the RHS of character 2, is in the third position from the RHS of character 2 and, therefore, has a −3 error position value. This −3 error position value would be stored in RAM 27. Thus, in this latter binar 0 clocking step (in the subroutine of FIG. 6E), the subroutine would cause $11+(-3)$ or 8 additional binary 0's to be clocked into the shift register 15. As a result of this data shift to correct or positionally compensate for the exemplary defective element $R_{42}$, elements $R_1$–$R_8$ will now be extra unused elements, elements $R_9$–$R_{307}$ will now be assigned to the 16-character-wide information to be thermally printed, with defective element $R_{42}$ now being in the gap between characters 1 and 2, and elements $R_{308}$–$R_{320}$ will now be extra unused elements.

It should be realized that, in the unlikely event that a defective element is detected which already lies between adjacent characters in the serial data, no action would be taken by the software program in the processor 19 to reposition the serial data, since a 0 error position for that defective element would be stored in the RAM 27, as indicated in the subroutine of FIG. 6D. Such a 0 error position would not cause any repositioning of the serial data, as indicated in the subroutine of FIG. 6E.

The invention thus provides a system and method for automatically detecting defective thermal printhead elements in a thermal printer and for automatically correcting for at least one defective thermal printhead element.

While the salient features of the invention have been illustrated and described, it should be readily apparent to those skilled in the art that many changes and modifications can be made in the system and method of the invention presented without departing from the spirit and true scope of the invention. Accordingly, the present invention should be considered as encompassing all such changes and modifications of the invention that fall within the broad scope of the invention as defined by the appended claims.

We claim:

1. In a thermal printer including a linear array of thermal elements, an apparatus comprising:

means for producing during a first mode of operation serial character data having a preselected number of character positons selectively associated with said thermal elements and for producing during a second mode of operation serial test data;

means coupled to said thermal elements being selectively responsive to said serial test data for developing for each of said thermal elements an associated test signal during each second mode of operation;

means for selectively comparing each test signal for each said thermal element against an associated predetermined reference signal in order to automatically generate an associated failure signal when a defective thermal element is detected during a second mode of operation; and means responsive to a failure signal associated with a defective thermal element for automatically causing said producing means to change the character positions associated with said thermal elements so that said defective thermal element is located between adjacent character positions.

2. In a thermal printer including a linear array of thermal elements, an apparatus comprising:

means for producing during a first mode of operation serial character data having a preselected number of character positions selectively associated with said thermal elements and for producing during a second mode of operation serial test data;

means coupled to said thermal elements being selectively responsive to said serial test data for developing for each of said thermal elements as associated test signal during each second mode of operation;

means for selectively comparing each test signal for each said thermal element against an associated predetermined reference value in order to generate an associated faiure signal when a defective thermal element is detected during a second mode of operation; and means for storing the initial test signals respectively derived by said developing means for said thermal elements during an initial second mode of operation, each said initial test signal derived for an associated thermal element being said associated predetermined reference value for said associated thermal element.

3. The apparatus of claim 2 wherein:

said storing means is a non-volatile memory.

4. The apparatus of claim 1 wherein:

said comparing means utilizes a fixed predetermined signal as said predetermined reference signal to compare against each test signal of each of said thermal elements.

5. In a thermal printer including a linear array of thermal elements, an apparatus comprising:

means for producing during a first mode of operation serial character data having a preselected number of character positions selectively associated with said thermal elements and for producing during a second mode of operation serial test data;

means coupled to said thermal elements being selectively responsive to said serial test data for developing for each of said thermal elements an associated test signal during each second mode of operation, said developing means including: means for removing a first voltage from said thermal elements to prevent said thermal elements from printing during the second mode of operation; voltage divider means responsive to said serial test data and to the removal of said first voltage for outputting a second voltage corresponding to the resistance of said thermal element being selected to be tested; and means for converting said second voltage to a test signal associated with said thermal element being selected to be tested; and means for selectively comparing each test signal for each said thermal element against an associated predetermined reference value in order to generate an associated failure signal when a defective thermal element is detected during a second mode of operation.

6. In a thermal printer including a linear array of thermal elements, an apparatus comprising:

processing means for producing during a first mode of operation serial character data having a preselected number of character positions selectively associated with said thermal elements and for producing during a second mode of operation a control signal and test data;

means being responsive to said serial character data for selectively applying signals corresponding to said serial character data to said thermal elements during the first mode of operation and for selectively applying signals corresponding to said test data to said thermal elements during the second mode of operation;

means being responsive to the absence of said control signal for enabling said thermal elements to be selectively energized in accordance with said serial character data and being responsive to the presence of said control signals for enabling said thermal elements to be selectively measured during each second mode of operation; and means coupled to said thermal elements for developing for each of said thermal elements as associated test signal during each second mode of operation;

said processing means including means for selectively comparing each test signal for each of said thermal elements against an associted predetermined reference signal in order to automatically generate an associated failure signal when a defective thermal element is detected, and program means responsive to said failure signal associated with said defective thermal element for automatically causing the character positions of the serial character data to be changed so that said defective thermal element is located between that changed character positions of the serial character data.

7. In a thermal printer including a linear array of thermal elements, an apparatus comprising:

processing means for producing during a first mode of operation serial character data having a preselected number of character positions selectively associated with said thermal elements and for producing during a second mode of operation a control signal and test data;

means being responsive to said serial character data for selectively applying signals corresponding to said serial character data to said thermal elements during the first mode of operation and for selectively applying signals corresponding to said test data to said thermal elements during the second mode of operation;

means being responsive to the absence of said control signal for enabling said thermal elements to be selectively energized in accordance with said serial character data and being responsive to the presence of said control signals for enabling said thermal elements to be selectively measured during each second mode of operation; and means coupled to said thermal elements for developing for each of said thermal elements an associated test signal during each second mode of operation;

said processing means including means for selectively comparing each test signal for each of said thermal elements against an associated predetermined reference value in order to generate an associated failure signal when a defective thermal element is detected, and program means responsive to said failure signal associated with said defective thermal element for causing the character positions of the serial character of data to be changed so that said defective thermal element is located between the changed character positions of the serial character data, and wherein said associated predetermined reference value is the initial test signal derived for each of said thermal elements and said comparing means selectively compares the initial test signals of said thermal elements with associated subsequent test signals of said thermal elements and generates a failure signal for a defective thermal element when one of the subsequent test signals associated with said defective thermal element exceeds the amplitude of the initial test signal associated with said defective thermal element by a preselected amount.

8. In a therma printer including a linear array of thermal elements, an apparatus comprising:

processing means for producing during a first mode of operation serial character data having a preselected number of character positions selectively associated with said thermal elements and for producing during a second mode of operation a control signal and test data;

means being responsive to said serial character data for selectively applying signals corresponding to said serial character data to said thermal elements during the first mode of operation and for selectively applying signals corresponding to said test data to said thermal elements during the second mode of operation;

means being responsive to the absence of said control signal for enabling said thermal elements to be selectively energized in accordance with said serial character data and being responsive to the presence of said control signals for enabling said thermal elements to be selectively measured during each second mode of operation; and means coupled to said thermal elements for developing for each of said thermal elements an associated test signal during each second mode of operation;

said processing means including means for selectively comparing each test signal for each or said thermal elements against an associated predetermined reference value in order to generate an associated failure signal when a defective thermal element is detected, and program means responsive to said failure signal associated with said defective thermal element for causing the character positions of the serial character data to be changed so that said defective thermal element is located between the changed character positions of the serial character data, and wherein said associated predetermined reference value is a fixed predetermined value and said comparing means selectively compares each test value of each of said thermal elements with said fixed predetermined value and generates a failure signal for a defective thermal element when one of the subsequent test signals associated with said defective thermal element exceeds the amplitude of the fixed predetermined value.

9. In a thermal printer system including a linear array of thermal elements and storage circuitry having character positions associated with said thermal elements, an apparatus comprising:

means for selectively developing for each of said thermal elements an associated initial reference signal and an associated test signal during each of a sequence of test periods;

means responsive to the associated initial reference signal for each test signal for each of said thermal elements for automatically generating an associated first signal when a defective thermal element is detected; and means responsive to said first signal associated with said defective thermal element for automatically changing the character positions associated with said thermal elements so that said defective thermal element is located between character positions.

10. In a thermal printer system having a plurality of storage circuits for serially storing zero and one state bits of character data, a plurality of heater elements, and a plurality of circuits selectively enabled by a common strobe pulse and by each one state bit from the plurality of storage circuits for selectively enabling the plurality of heater elements in a thermal printhead to thermally print during an operational mode; an apparatus for automatically detecting and compensating for at least one defective heater element, said apparatus comprising;

processor means for generating during an operational mode of operation serial data comprised of groups of character data bits separated by a preselected number of zero state bits and for generating during a test mode of operation a control signal and a one state test bit to be serially shifted through said plurality of storage circuits; and first means responsive to the initial said control signal for producing and storing in said processor means an initial test signal for each of said plurality of heater elements as the initial one state bit is shifted through said plurality of storage circuits during the initial test mode of operation, said first means being responsive to each subsequent control signal for producing a subsequent test signal for each of said plurality of heater elements as the associated subsequent test bit is shifted through said plurality of storage circuits during each subsequent test mode of operation;

said processor means receiving said test signals and including second means for producing a failure signal when a subsequent test signal for one of said heater elements deviates from the associated initial test signal for said one of said heater elements by a preselected amount, and third means responsive to said failure signal for positioning the serial data during an operational mode such that said one of said heater elements is not utilized in subsequent thermal printing.

11. A method for automatically detecting any defective thermal element in a linear array of thermal elements in a thermal printer, said method comprising the steps of:

determining an associated reference signal for each thermal element;

storing the associated reference signal for each thermal element;

measuring a test signal for each thermal element during each of a sequence of test modes of operation;

comparing each test signal for each thermal element with its associated reference signal during each test mode of operation;

detecting a defective thermal element when a test signal for that defective thermal element deviates by a preselected amount from the associated reference signal for that thermal element during said comparing step; and automatically changing the position of serial data bits carrying data to be printed during a normal thermal printing operation such that the detected defective thermal element is not utilized during the normal printing operation.

12. A method for automatically detecting any defective thermal element in a linear array of thermal elements in a thermal printer, said method comprising the steps of:

determining an associated reference signal for each thermal element, said determining step comprising the step of measuring an associated initial test signal for each thermal element during an initial test mode of operation in order to determine the associated reference signal for each thermal element;

storing the associated reference signal for each thermal element;

measuring a test signal for each thermal element during each of a sequence of test modes of operation;

comparing each test signal for each thermal element with its associated reference signal during each test mode of operation; and detecting a defective thermal element when a test signal for that defective thermal element deviates by a preselected amount from the associated reference signal for that thermal element during said comparing step.

13. The method of claim 12 wherein said determining step comprises the step of:

selecting a fixed predetermined signal to be commonly used as the associated reference signal for each thermal element.

* * * * *